(12) United States Patent
Turner

(10) Patent No.: US 10,296,544 B2
(45) Date of Patent: May 21, 2019

(54) METHODS AND SYSTEMS FOR IMPROVED SEMANTIC MESHING

(71) Applicants: Carcema Inc., Gatineau (CA); 6899005 Canada Inc., Gatineau (CA)

(72) Inventor: Joshua Turner, Gatineau (CA)

(73) Assignees: Carcema Inc., Quebec (CA); 6899005 Canada Inc., Quebec (CA)

(*) Notice: Subject to any disclaimer, the term of this patent is extended or adjusted under 35 U.S.C. 154(b) by 310 days.

(21) Appl. No.: 15/189,961

(22) Filed: Jun. 22, 2016

(65) Prior Publication Data

US 2016/0371310 A1 Dec. 22, 2016

Related U.S. Application Data

(60) Provisional application No. 62/182,872, filed on Jun. 22, 2015.

(51) Int. Cl.
*G06F 17/30* (2006.01)
*G06F 16/93* (2019.01)
*G06F 16/2455* (2019.01)
*G06F 16/31* (2019.01)

(52) U.S. Cl.
CPC ........ *G06F 16/93* (2019.01); *G06F 16/24568* (2019.01); *G06F 16/325* (2019.01)

(58) Field of Classification Search
CPC ... G06F 16/93; G06F 16/24568; G06F 16/325
See application file for complete search history.

*Primary Examiner* — Robert W Beausoliel, Jr.
(74) *Attorney, Agent, or Firm* — Timothy W. Menasco, Esq.; Harter Secrest & Emery LLP

(57) ABSTRACT

In at least one embodiment, the present invention provides methods and systems for improved semantic meshing, comprising receiving an input data stream consisting of a plurality of characters; generating a normalized stream having an initial value based on said input data stream; applying a plural character rolling window to a subset of the normalized stream to select at least one stream subset, applying a first uniform hash function to the at least one stream subset to create at least one digest, identifying a cut if the modulus of the digest is zero, such that identifying a cut includes applying a second uniform hash function to the remainder values of the normalized stream, generating at least one shingle, resetting the plural character rolling window with a plurality of zeros and aggregating the at least one shingle into a semantic hash.

10 Claims, 2 Drawing Sheets

METHODS AND SYSTEMS FOR IMPROVED SEMANTIC MESHING

FIELD

The present invention relates to information management and governance. More specifically, the present invention relates to methods and systems for the improved semantic meshing of digital data files.

BACKGROUND

In the fields of information management and governance it is frequently desirable to be able to identify a subset of documents that are considered "similar" to one another. Although readily understood in a colloquial or qualitative sense, "similarity" is a poorly-defined concept.

There are a number of challenges that are presented when trying to determine the similarity of a plurality of digital data files. Some of these challenges include, but are not limited to, file format impedance, performance considerations, sample window alignment and comprehensibility.

With respect to file format impedance, it is well known that different software vendors use different ways of writing files which can give substantially similar content from completely dissimilar (and incomparable) representations on disk, which can significantly complicate the task of detecting the similarity of two (or more) digital data files.

With respect to performance considerations, it will be readily appreciated that detecting similarity is generally only useful when applied to large volumes of content. Simple implementations of similarity detection have performance limitations that increase sharply as more (and larger) documents are added to the plurality of digital data files being considered.

With respect to sample window alignment, it will be readily appreciated that known methods of block-based sampling have an inherent problem when determining digital data file similarity as insertions or deletions in the middle of a file subsequently shift which bytes/characters are in subsequent sampled blocks.

Finally, with respect to the concept of comprehensibility, a given collection can have a resultant set of similarity relationships that ranges from no similarity at all to every file being identical, with no clear way to make the results presentable. In these instances, the best guarantee of outcome is that there will be some number of nodes with some number of relationships running in a single (but not predictable) non-directed graph of relationships with an arbitrary number of roots.

A number of prior art solutions have been developed in an attempt to address at least some of these challenges discussed above when trying to identify a subset of similar digital data files when presented with a plurality of seemingly otherwise disparate digital data files.

For example, known block-deduplicating file systems, such as ZFS, can detect files with identical beginnings; yet such systems can store only the differences detected after the first change.

Further, known genetic sequence alignment algorithms such as BLAST and FAST can detect subsequence segments in long stretches of DNA, however these algorithms cannot do many-to-many comparisons of segments simultaneously or efficiently.

Moreover, Fuzzy-Hash algorithms such as SSDEEP can find one-to-one similarities of raw byte streams, but cannot detect similarity across file formats, nor can they efficiently do many-to-many comparisons.

Furthermore, the aforementioned comprehensibility problem has been addressed in a variety of different ways. Two such examples include microarray heatmaps and subsample cluster analysis.

Microarray heatmaps often employ rectangular arrays of colour for many-to-many comparison of large arrays, but this approach has the fundamental weakness that the appearance is dependent on the sort applied to each axis and that every cell in the array needs to be calculated, which has the potential to be very expensive in terms of processing resources.

Alternatively, subsample cluster analysis involves the use of a subset of the matched documents, which simply renders a list of the relationships attached to that particular document.

Therefore, it would be desirable to detect subsets of digital data files that are all composed of substantially similar subsequences, regardless of where the differences between the files are actually located.

Accordingly, there is need for methods and systems for the improved semantic meshing of digital data files.

BRIEF SUMMARY

The present invention provides systems and methods for improved semantic meshing.

In at least one embodiment, it is contemplated that the present invention can provide a method for improved semantic meshing, having the steps of receiving at least one first input data stream consisting of a plurality of characters and corresponding to at least a first document retrieved from a database and at least one second input data stream consisting of a plurality of characters and corresponding to at least a second document retrieved from a database, generating at least one first normalized stream having an initial value based on the at least one first input data stream and at least one second normalized stream having an initial value based on the at least one second input data stream, applying a plural character rolling window to a subset of the at least one first normalized stream and the at least one second normalized stream to select at least one stream subset from each of the at least one first normalized stream and the at least one second normalized stream, each at least one stream subset having a plurality of characters and an initial at least one stream subset value and a last at least one stream subset value, applying a first uniform hash function to each at least one stream subset to create at least one first digest and at least one second digest, and determining a modulus of the at least one first digest and the at least one second digest using a scaling factor, the scaling factor selected based on a size of at least one of the at least one first normalized stream and the at least one second normalized stream, identifying a cut when the modulus is determined to be equal to zero, and applying a second uniform hash function to at least one set of remainder values of the at least one first normalized stream and the at least one second normalized stream, the at least one set of remainder values including the characters of at least one of the at least one first normalized stream and the at least one second normalized stream extending from the initial value of the at least one first normalized stream or the at least one second normalized stream to the respective initial of the at least one stream subset value, generating at least one shingle from the output of the second uniform hash function, resetting the plural character rolling window with a plurality of zeros, appending the at least one shingle into at least one semantic hash, and storing the semantic hash in the database.

BRIEF DESCRIPTION OF THE FIGURES

The following invention will be better understood in connection with the following Figures, in which.

DETAILED DESCRIPTION OF THE EMBODIMENTS

Figure 1:
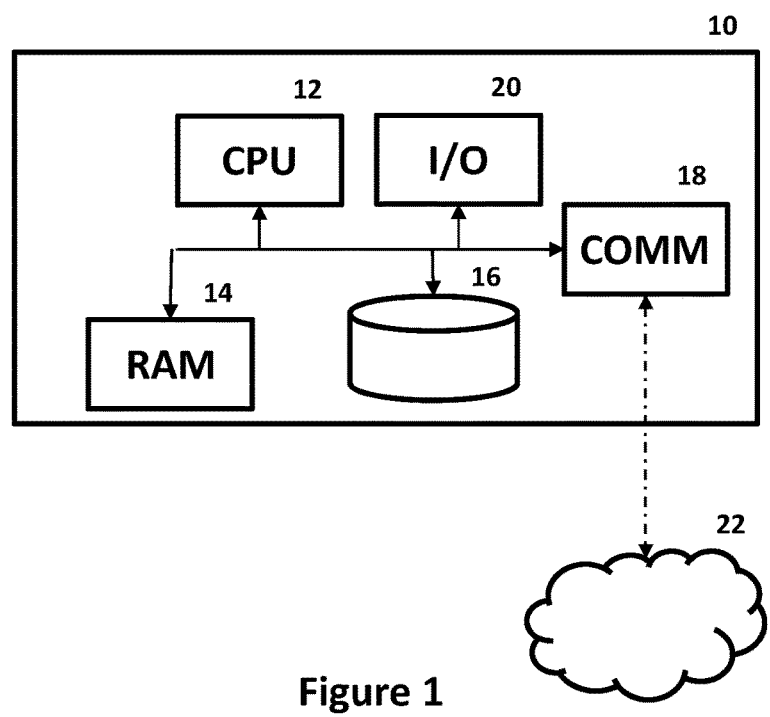
FIG. 1 is an illustration of at least one embodiment of a computer terminal for use in connection with the present invention.

It will be readily appreciated that the presently disclosed methods and systems may be performed in a variety of manners using a wide variety of suitable hardware, as will be readily contemplated by the skilled person.

The present methods and systems for improved semantic meshing can overcome the aforementioned block alignment problem by using a local condition (such as, for example, a 7-byte wide rolling window) to determine where to cut the data stream into blocks. In this way, it is contemplated that any insertions and deletions to the source data stream only affect the contents of a single block or, if the insertion modifies the content of a triggering 7-byte sequence, a pair of neighbouring blocks. In all cases, it is contemplated that small changes to the source content will in turn produce small, contained changes to the resultant digest.

It is further contemplated that the present methods and systems for improved semantic meshing can overcome the file format impedance problem by using a set of file format text extraction utilities to extract the text from files as a stream of characters and then employ a set of transformations to eliminate parts of the text stream that are not semantically meaningful in order to create a normalized stream for the detection of similarity.

It is further contemplated that the present methods and systems for improved semantic meshing can overcome the performance problem by precalculating data structures that can represent, enable and accelerate a set of cheaply and easily calculable threshold conditions for similarity, eliminating the vast majority of similarity candidate relationships at minimal resource cost with respect to processing resources, and conducting more computationally expensive comparisons only where pairs meet all of the threshold conditions.

At the same time, it is contemplated that as the set of "successful" similarity matches fill up, the minimum degree of similarity applied to the threshold conditions is raised to the minimum level necessary to supplant any of the successful matches so far. This has the effect of "raising the bar" as the process runs, allowing the present method to automatically consider fewer candidate pairs as the present invention progresses through the collection.

It is contemplated that the present methods and systems for improved semantic meshing can represent the resultant set of relationships using a force-directed mesh. In these embodiments, the non-directed graph is modelled as a physical system of springs, mass, friction, and gravitation and the relationships are allowed to self-organize. It is contemplated that these graphs rapidly settle into a state where a user can easily see the parts of the collection that are derived from each other.

In some embodiments, the presently disclosed methods and systems can detect content that has been derived from other content, regardless of the source. Accordingly, it is contemplated that in some embodiments the presently disclosed methods and systems can be used for detecting, for example, plagiarism, fraud, draft versions of documents, information leaks, and wasted space on storage devices, among other desired actions as will be readily appreciated by the skilled person.

It is contemplated that the presently disclosed methods and systems can also optimize content ordering in lossless compressed content streams. In embodiments that include data streams using backwards references for compression, it is contemplated that placing similar content close together in the stream can increase the chance that shared subsequences will be in the compression scope during the process of compression, thereby improving the compression ratio for what is otherwise identical content.

It is further contemplated in some embodiments that the present invention can provide a method that is adapted to consider a large collection of documents in various file formats, and find the most similar pairs of documents having a substantially similar subsequences of content in a short time.

In this way, it is contemplated that the present systems and methods can have applications in both information governance applications (for the detection of, for example, versions, leaks, plagiarism, and fraud) and in content storage and compression applications (for eliminating, for example, duplicate blocks or streams on a file system, and for ordering content in a container that will be subjected to lossless compression, in order to maximize the amount of compression in the stream).

In some embodiments, it is contemplated that the user can designate a collection of information resources that can be represented as a sequence of characters or bytes. In the present disclosure, it is contemplated that the term character or byte can be used interchangeably.

The system can then retrieve these streams of bytes, and in some embodiments use a set of libraries to transform those bytes into a character stream, discarding all of the characters which do not directly contribute to the textual meaning of the document. In some embodiments it is contemplated that this character stream can be represented internally as Unicode code points.

In some embodiments, it is contemplated that the character stream can be normalized to remove all characters which do not represent letters or numbers in any language, leaving a long sequence of characters. For example, in embodiments involving languages having the concept of majuscule letters, it is contemplated that all majuscules are replaced with their minuscule peers in the provided output, which can be referred to as the *normalized stream*.

Further, it is contemplated that depending on the number of characters in the resultant normalized stream, a scaling factor can be selected, and in at least one embodiment the selected scaling factor is roughly proportional to the logarithm of the size of the normalized stream. As will be readily appreciated by the skilled person, streams within a given size bracket will produce the same scaling factor.

In at least one embodiment, a multi-character rolling window is passed along the normalized stream to select a subset of multiple characters of the normalized stream corresponding to the multi-character rolling window. In at least one embodiment, it is contemplated that the multi-character window is 7 characters wide; however other sizes of character windows are readily contemplated by the skilled person.

Next, it is contemplated that a first uniform hash function can subsequently be applied to this subset (i.e.: the characters within the window). If the modulus of the digest and the scaling factor returns zero, the window is said to have triggered a "cut", as this indicates that these values are identical, as will be understood by the skilled person. It is also contemplated that the scaling factor can, in some embodiments, be selected to have at least one large prime factor that can fit comfortably within the multi-character window.

As will be readily understood by the skilled person, two numerical values are considered congruent with respect to a particular numerical value (i.e. the "modulus" or "modulo") if they give the same remainder when divided by that number. For example: 19 and 64 are congruent modulo 5, as both numbers give a remainder of 4 when divided by 5.

In the context of the present invention, it is contemplated that the digest can be a whole number, the scaling factor can be a whole number and accordingly if dividing the digest by the scaling factor leaves no remainder, a cut is triggered. In other words, if the digest can be evenly divided by the scaling factor, a cut is triggered.

In other embodiments, it is contemplated that if a first digest (corresponding to a first document under consideration) can be evenly divided by a second digest (corresponding to a second document under consideration), a cut is triggered.

When a cut is triggered, all of the bytes since the previous cut (or, in some embodiments, the beginning of the stream) are hashed using a second simple uniform hashing function, and a shingle is produced to represent the contents of the variable-length span between the cuts. The rolling window can then be reset to contain zeroes prior to starting the next segment of the normalized stream and the process can continue.

Subsequently, it is contemplated that the set of produced shingles can be assembled into a string corresponding to a particular document under consideration that is subsequently stored for future retrieval. It is further contemplated that this string constitutes the *semantic hash* of a document. As will be readily appreciated by the skilled person, similar documents will produce semantic hashes with low Levenshtein distances.

Comparison Acceleration

In at least one embodiment, it is contemplated that the semantic hashes can be compared using any of a wide variety of known algorithms, but in at least one embodiment it is contemplated that the comparator routine accelerates comparisons using a set of threshold functions and a minimum similarity cutoff.

In this embodiment, it is contemplated that the first cutoff is length comparison. If the ratio of the lengths of the hashes to be compared exceeds the minimum similarity, the candidate pair is subsequently discarded.

Further, it is contemplated that the second cutoff can be a difference of incidence histograms. For example, given two hashes x and y, a histogram of the number of incidences of each shingle is created and stored. It is contemplated that these histograms can then be subtracted from one another in order to produce a histogram z (with, in some embodiments, potentially negative values in some buckets, as will be understood by the skilled person). It is contemplated that identical hashes will produce perfectly empty values for z.

Next, it is contemplated that the sum of the absolute values of the buckets in the z histogram can then be compared to the total of the x hash, producing an incidence factor that will be equal or higher than the actual similarity value.

In embodiments where the considered hash pairs produce incidence factors lower than the similarity cutoff value, the hash pairs can be subsequently discarded.

Next, hash pairs which pass both first and second cutoffs discussed herein can then subsequently be compared using a dynamic programming approach to the determined Levenshtein distance. In at least one embodiment, it is contemplated that the ratio of the Levenshtein distance to the length of the first hash can then be used as the similarity factor, among other arrangements that will be readily appreciated by the skilled person.

EXAMPLE

By way of example and as will be readily understood by the skilled person, given some set of n semantic hashes:

Set(n)=[1, 2, 3 . . . n]

Each hash has a sequence of shingle values, represented here as decimal digits for clarity:

Hash 1=97345778230438800260883303
Hash 2=36883750650450458164411094 8
Hash 3=9734576823043880268303

For each sequence, two derived values can be inexpensively (with respect to processing power) calculated (with respect to processing power): a length, and an occurrence histogram of each shingle:

| Hash | Length | Histogram |
| --- | --- | --- |
| 1 | 24 | [4, 0, 2, 5, 2, 1, 1, 3, 5, 1] |
| 2 | 24 | [3, 3, 0, 2, 4, 3, 3, 1, 4, 1] |
| 3 | 22 | [3, 0, 2, 5, 2, 1, 2, 2, 4, 1] |

As will be understood by the skilled person, comparing a pair of hashes (1 and 2 in the example provided herein) follows a sequence of gateway conditions, in increasing order of computational cost.

Given a minimum similarity of 50%:
Length of 1÷Length of 2=24/24=1
As the lengths differ by less than 50%, so the pair passes to the next condition.
The difference of the two histograms:
Histogram 1: [4, 0, 2, 5, 2, 1, 1, 3, 5, 1]
Histogram 2: [3, 3, 0, 2, 4, 3, 3, 1, 4, 1]
Difference=[1, −3, 2, 3, −2, −2, −2, 2, 1, 0]
Flipping the result to absolute values yields:
Absolute value of Difference=[1, 3, 2, 3, 2, 2, 2, 2, 1, 0]
The sum of buckets yields:
Sum [1, 3, 2, 3, 2, 2, 2, 2, 1, 0]=18
Accordingly, the ratio of the sum to the length of the hash: 18/24=0.75—which, being greater than the 50% cutoff, excludes the pair from being identified as similar.
Comparing a second pair of hashes (1 and 2 in the example provided herein) follows the same sequence of gateway conditions:
Given a minimum similarity of 50%:
Length of 1÷Length of 2=22/24=0.916
The lengths differ by less than 50%, so the pair passes to the next condition.

The difference of the two histograms:
Histogram 1: [4, 0, 2, 5, 2, 1, 1, 3, 5, 1]
Histogram 3: [3, 0, 2, 5, 2, 1, 2, 2, 4, 1]
Difference=[1, 0, 0, 0, 0, 0, −1, 1, 1, 0]
Flipping the result to absolute values yields:
Absolute value of Difference=[1, 0, 0, 0, 0, 0, 1, 1, 1, 0]
The sum of buckets yields:
Sum [1, 0, 0, 0, 0, 0, 1, 1, 1, 0]=4
Accordingly, the ratio of the sum to the length of the hash: 4/24=0.17
Which, being less than the 50% cutoff, promotes the pair to the next condition—calculating actual Levenshtein distance, as would be understood by the skilled person:
Lev("9734577823043880260883303", "9734576823043880268303")=3
3/24=0.13—which, being less than 50%, flags this pair as similar.

Turning to FIG. 1, at least one embodiment of a computer terminal 10 that can be used in connection with the present invention is illustrated. It will be readily appreciated that computer terminal 10 can take the form of a desktop computer, laptop computer, a mobile device and remote server, among any other suitable types of computer terminal that will be readily understood by the skilled person.

In this embodiment, computer terminal 10 includes a processor 12 (such as, but not limited to, a central procession unit, among other arrangements that will be readily appreciated by the skilled person) in electronic communication with temporary storage 14 (such as, but not limited to, static or dynamic random access memory, among other arrangements that will be readily appreciated by the skilled person), database storage 16, a communications module 18 and any suitable input/output peripheral 20. Communication module 18 can include, but is not limited to, a radio frequency module or an optical communication module as will be readily appreciated by the skilled person. Moreover, it is further contemplated that communications module 18 may include transmitting and receiving functions and may be in wired or wireless communication with optional remote database storage 22.

Figure 2:
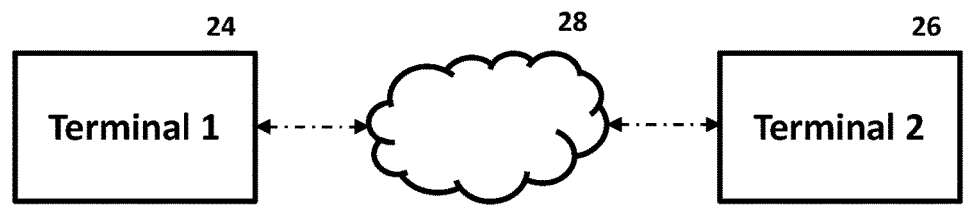
FIG. 2 is an illustration of at least one embodiment of at least two computer terminals as illustrated in FIG. 1 in electronic communication over a network.

Turning to FIG. 2, an embodiment demonstrating two computer terminals, pursuant to FIG. 1, in communication with one another is illustrated. In this embodiment, first computer terminal 24 is in wireless, remote communication with second computer terminal 26 through a communication network 28, however other arrangements are also contemplated as will be readily understood by the skilled person. In this embodiment, it is contemplated that first computer terminal 24 and/or second computer terminal 26 can be a desktop computer, laptop computer, a mobile device and remote server, among any other suitable types of computer terminal that will be readily understood by the skilled person. In the present context, it is contemplated that the first and second computer terminals 24, 26 can function as distributed system node(s) as will be readily understood by the skilled person.

Figure 3:
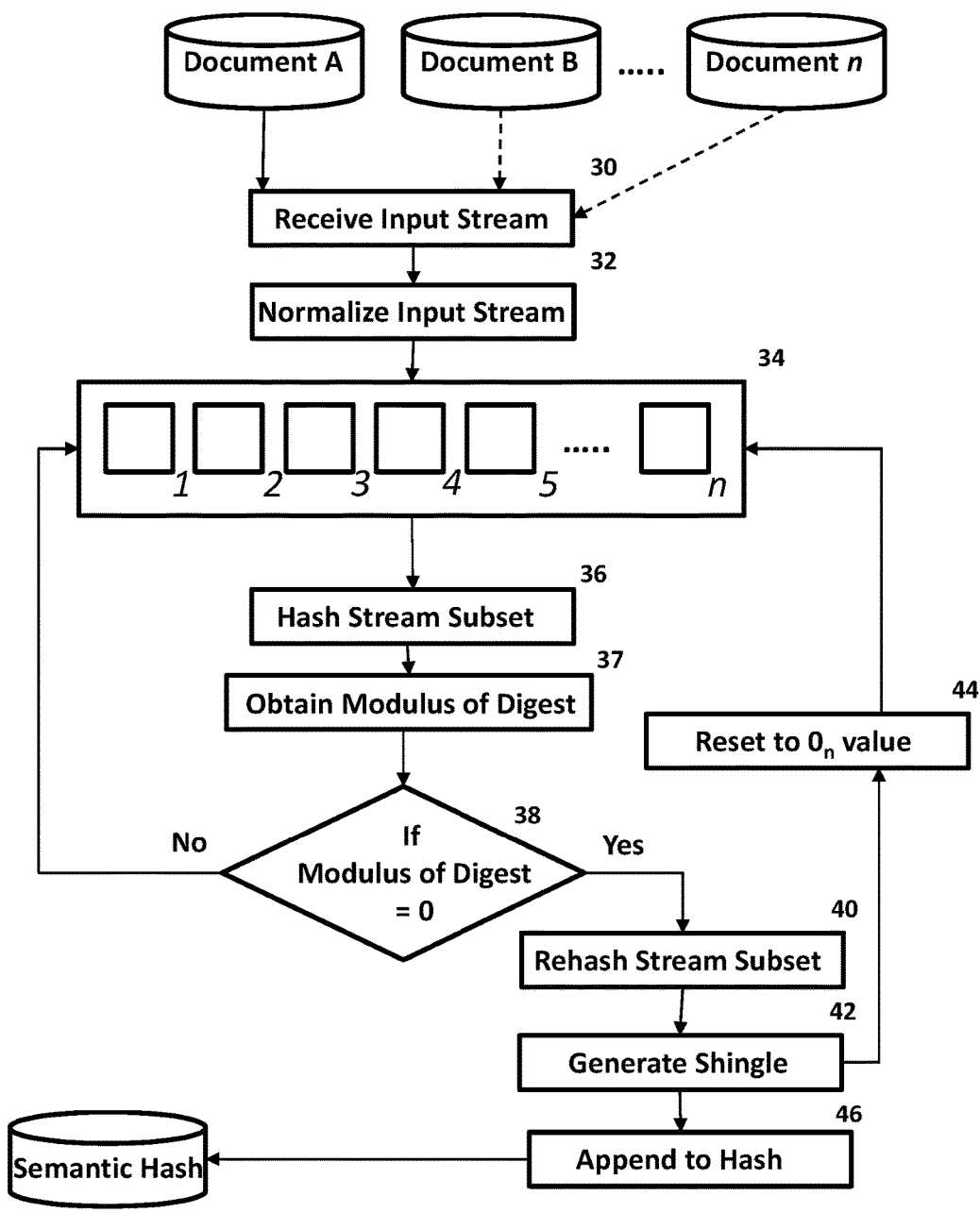
FIG. 3 is an illustration of at least one embodiment of a system and method in accordance with the present invention.

Turning to FIG. 3, at least one embodiment of a system and method in accordance with the present invention is illustrated. In this embodiment, at least a first and second document is retrieved from a database. It will be readily understood that these documents are electronic documents having associated electronic data and can be any type of suitable electronic document as will be understood by the skilled person, without limitation, and that the database can be any suitable type of electronic database for storing or generating suitable electronic documents or data in a structured manner for use in connection with the present invention including but not limited to a remote cloud server database, a local hard drive or temporary RAM, among any other suitable type of electronic databases as will be readily appreciated by the skilled person.

Moreover, for the purposes of the present invention it is contemplated that electronic documents and associated electronic data can be received (extracted or pushed) by the computer terminal performing the present invention from a live stream of data that is obtained from a remote cloud server database such as, but limited to, a social network, among other analogous arrangements that will be readily appreciated by the skilled person. In other embodiments, it is contemplated that electronic documents and associated electronic data can be received (extracted or pushed) by the computer terminal performing the present invention, such as for example, an email sent from an email server (or analogous electronic message) containing an electronic document for consideration.

Next, at least one input data stream is received by a suitable computer terminal. In some embodiments it is contemplated that the computer terminal is at least one distributed system node, as discussed previously.

In at least one embodiment, the at least one input data stream is extracted from each document 30 and received by the computer terminal performing the present invention. It is contemplated that extraction can be achieved using any suitable set of known file format text extraction utilities as will be readily understood by the skilled person. In other embodiments, it is contemplated that the least one input data stream is pushed to the computer terminal performing the present invention in a manner that will be readily appreciated by the skilled person.

In this embodiment, it is contemplated that the at least one input stream is comprised of a plurality of characters, which are subsequently normalized to generate in a normalized stream 32. Specifically, it is contemplated that normalization involves the process of removing characters from the at least one input stream to remove any characters that are predetermined as not semantically meaningful.

A plural character rolling window is subsequently applied to a selected subset of this normalized stream 34. In this embodiment, it is contemplated that an n-character rolling window is applied to the selected subset of the normalized stream. It is contemplated that this stream subset also is comprised of a plurality of characters and has a first stream subset value and a last stream subset value.

Next, a suitable uniform hash function is applied to the stream subset value 36 to create a digest (i.e. hash output) obtained from the normalized stream subset retrieved from each of the documents under comparison. Next, the modulus of these digests are obtained 37 which in some embodiments can occur using a scaling factor selected based on the size of the normalized stream under consideration, among other arrangements that will be readily understood by the skilled person.

Next, a comparative function 38 is automatically employed wherein if the modulus of the hashed stream subsets under comparison is determined to be equal to zero, a cut is identified and a suitable second uniform hash function is applied to at least one set of remainder values of the normalized stream 40.

It is contemplated that in some embodiments the at least one set of remainder values can include the characters of the initially obtained normalized stream 32 that extend from the initial value of the normalized stream to the initial at least one stream subset value obtained at step 34. In other embodiments, the remainder values under consideration are those values present between the last character of the previous cut identified and the first value of the presently identified cut. In other words, the remainder values are those values that exist between identified cuts, as will be readily understood by the skilled person.

Next, at least one shingle is generated 42 from the output of the second uniform hash function applied at step 32 to represent these remainder values that precede the identified cut. Subsequently, the plural character rolling window is reset with a plurality of zeros 44, and the at least one shingle is appended to at least one semantic hash 46, which is finally stored in a suitable database for future retrieval as required by the present method.

In this way a number of shingles can be appended together in a semantic hash that is stored in a database and representing the data values in a document that exist between "cuts" or otherwise similar data points within the documents. Therefore, and as discussed above, the skilled person will appreciate that similar documents will produce semantic hashes with low Levenshtein distances, which can be in turn used to identify similar documents in an efficient, many to many comparison, as required by the practitioner of the present invention.

The present disclosure provides for reference to specific examples. It will be understood that the examples are intended to describe embodiments of the invention and are not intended to limit the invention in any way. Moreover, it is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A method for improved semantic meshing, comprising the steps of:
   automatically extracting and receiving, with a computer terminal, at least one first input data stream consisting of a plurality of characters and corresponding to at least a first electronic document automatically retrieved from a database by the computer terminal and at least one second input data stream consisting of a plurality of characters and corresponding to at least a second electronic document automatically retrieved from the database by the computer terminal, the database in electronic communication with the computer terminal over an electronic communication network;
   automatically generating, with the computer terminal, at least one first normalized stream having an initial value based on the at least one first input data stream and at least one second normalized stream having an initial value based on the at least one second input data stream;
   automatically applying, with the computer terminal, a predetermined plural character rolling window to a subset of the at least one first normalized stream and the at least one second normalized stream to select at least one stream subset from each of the at least one first normalized stream and the at least one second normalized stream, each at least one stream subset having a plurality of characters and an initial at least one stream subset value and a last at least one stream subset value,
   automatically applying, with the computer terminal, a first uniform hash function to each at least one stream subset to create at least one first digest and at least one second digest; and
   automatically determining, with the computer terminal, a modulus of the at least one first digest and the at least one second digest using a scaling factor, the scaling factor selected based on a size of at least one of the at least one first normalized stream and the at least one second normalized stream;
   automatically identifying, with the computer terminal, a cut when the modulus is determined to be equal to zero; and
   automatically applying, with the computer terminal, a second uniform hash function to at least one set of remainder values of the at least one first normalized stream and the at least one second normalized stream, the at least one set of remainder values including the characters of at least one of the at least one first normalized stream and the at least one second normalized stream extending from the initial value of the at least one first normalized stream or the at least one second normalized stream to the respective initial of the at least one stream subset value;
   automatically generating, with the computer terminal, at least one shingle from the output of the second uniform hash function;
   automatically resetting, with the computer terminal, the plural character rolling window with a plurality of zeros;
   automatically appending, with the computer terminal, the at least one shingle into at least one semantic hash; and
   automatically storing the at least one semantic hash in the database.

2. The method of claim 1, wherein the at least one semantic hash is a first semantic hash corresponding to the first document and a second semantic hash corresponding to the second document, and further comprising the steps of:
   automatically determining, with the computer terminal, the Levenshtein distance between the first semantic hash and the second semantic hash; and
   automatically assigning, with the computer terminal, a similarity score to the first semantic hash and the second semantic hash based on the Levenshtein distance.

3. The method of claim 2 further comprising the step of:
   if the Levenshtein distance is above a predetermined threshold, automatically identifying, with the computer terminal, the first semantic hash and the second semantic hash as dissimilar.

4. The method of claim 3, wherein the first semantic hash and the second semantic hash are automatically compared, with the computer terminal, using a predetermined cutoff algorithm.

5. The method of claim 4, wherein the predetermined cutoff algorithm includes a ratio comparison of the length of the first semantic hash and the length of the second semantic hash, and further comprising the step of:
   If the ratio comparison exceeds a first predetermined threshold for minimum similarity, automatically identifying, with the computer terminal, the first semantic hash and the second semantic hash as dissimilar.

6. The methods of claim 5, wherein the predetermined cutoff algorithm further includes an incidence histogram comprising the steps of:

automatically generating, with the computer terminal, a first histogram of the occurrences of one of the at least one shingle in the first semantic hash;

automatically generating, with the computer terminal, a second histogram of the occurrences of one of the at least one shingle in the second semantic hash; and automatically generating, with the computer terminal, a resultant histogram by subtracting one of the first histogram and the second histogram from the other of the first histogram and the second histogram.

7. The method of claim 6, further comprising the step of if the resultant histogram contains results above a predetermined threshold, automatically identifying, with the computer terminal, the first semantic hash and the second semantic hash as dissimilar.

8. The method of claim 7 further comprising the steps of:

automatically comparing, with the computer terminal, the absolute value of the resultant histogram with the length of the first semantic hash to generate an incidence factor, and If the incidence factor is equal to or lower than a second predetermined threshold for minimum similarity, automatically identifying, with the computer terminal, the first semantic hash and the second semantic hash as dissimilar.

9. The method of claim 8 wherein the Levenshtein distance is automatically compared, by the computer terminal, to the length of at least one of the first semantic hash and the second semantic hash and a similarity score is automatically assigned, by the computer terminal, to the first semantic hash and the second semantic hash based on this comparison.

10. A system for improved semantic meshing, comprising:

a computer terminal comprising a processor, temporary storage, database storage, a communication module and at least one peripheral, the computer terminal adapted to:

receive at least one first input data stream consisting of a plurality of characters and corresponding to at least a first document retrieved from a database and at least one second input data stream consisting of a plurality of characters and corresponding to at least a second document retrieved from a database;

generate at least one first normalized stream having an initial value based on the at least one first input data stream and at least one second normalized stream having an initial value based on the at least one second input data stream;

apply a plural character rolling window to a subset of the at least one first normalized stream and the at least one second normalized stream to select at least one stream subset from each of the at least one first normalized stream and the at least one second normalized stream, each at least one stream subset having a plurality of characters and an initial at least one stream subset value and a last at least one stream subset value, apply a first uniform hash function to each at least one stream subset to create at least one first digest and at least one second digest; and determine a modulus of the at least one first digest and the at least one second digest using a scaling factor, the scaling factor selected based on a size of at least one of the at least one first normalized stream and the at least one second normalized stream;

identify a cut when the modulus is determined to be equal to zero; and apply a second uniform hash function to at least one set of remainder values of the at least one first normalized stream and the at least one second normalized stream, the at least one set of remainder values including the characters of at least one of the at least one first normalized stream and the at least one second normalized stream extending from the initial value of the at least one first normalized stream or the at least one second normalized stream to the respective initial of the at least one stream subset value;

generate at least one shingle from the output of the second uniform hash function;

reset the plural character rolling window with a plurality of zeros;

append the at least one shingle into at least one semantic hash; and store the semantic hash in the database.

* * * * *